US010691881B2

(12) United States Patent
Hirzel et al.

(10) Patent No.: US 10,691,881 B2
(45) Date of Patent: Jun. 23, 2020

(54) SPREADSHEET COMPILER FOR STREAM PROCESSING

(71) Applicant: International Business Machines Corporation, Armonk, NY (US)

(72) Inventors: Martin J. Hirzel, Ossining, NY (US); Rodric Rabbah, Yonkers, NY (US); Philippe Suter, New York, NY (US); Olivier Tardieu, White Plains, NY (US); Mandana Vaziri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/018,671

(22) Filed: Feb. 8, 2016

(65) Prior Publication Data

US 2017/0228357 A1   Aug. 10, 2017

(51) Int. Cl.
*G06F 17/00* (2019.01)
*G06F 40/18* (2020.01)

(52) U.S. Cl.
CPC .................................. *G06F 40/18* (2020.01)

(58) Field of Classification Search
CPC .................................................... G06F 17/246
USPC ........................................ 715/219, 212, 220
See application file for complete search history.

(56) References Cited

U.S. PATENT DOCUMENTS

| 6,766,512 | B1 | 7/2004 | Khosrowshahi et al. |
| 7,047,484 | B1 * | 5/2006 | Becker ............... G06Q 10/10 709/203 |
| 8,069,190 | B2 | 11/2011 | McColl et al. |
| 8,082,489 | B2 | 12/2011 | Jiang |
| 8,499,290 | B2 | 7/2013 | Messerly et al. |
| 8,788,928 | B2 * | 7/2014 | McColl ............... G06F 17/246 715/219 |
| 2007/0294665 | A1 * | 12/2007 | Papakipos ............ G06F 8/45 717/119 |

(Continued)

OTHER PUBLICATIONS

Vaziri, et al., "Stream Processing with a Spreadsheet", ECOOP 2014, Lecture Notes in Computer Science (LNCS), vol. 8586, Proceedings of 28th European Conference, Uppsala, Sweden, Jul. 28-Aug. 1, 2014, pp. 360-384.

*Primary Examiner* — Stephen S Hong
*Assistant Examiner* — Matthew J Ludwig
(74) *Attorney, Agent, or Firm* — Scully, Scott, Murphy & Presser, P.C.; Samuel Waldbaum, Esq.

(57) ABSTRACT

A method, system and computer readable program product are disclosed for compiling a spreadsheet to execute stream processing in a computing system. In an embodiment, the method comprises extracting a function from the spreadsheet, said function supporting data windows and stream partitioning in the computing system; and identifying input cells of the spreadsheet for holding input values for the function, and identifying output cells of the spreadsheet for holding output values of the function. In embodiments of the invention, a data stream is partitioned into a plurality of data stream partitions, and the extracted function is applied to the stream partitions in parallel. In embodiments of the invention, the extracted function is applied to the data stream partitions in series. The windows may be time based windows, and may be count based windows, and the windows may have variable sizes.

20 Claims, 12 Drawing Sheets

(56) References Cited

U.S. PATENT DOCUMENTS

| | | | |
|---|---|---|---|
| 2008/0016436 A1* | 1/2008 | Liu | H04L 67/34 |
| | | | 715/212 |
| 2008/0134158 A1* | 6/2008 | Salz | G06F 8/41 |
| | | | 717/148 |
| 2010/0057831 A1* | 3/2010 | Williamson | G06F 9/5027 |
| | | | 709/203 |

* cited by examiner

|   | A | B | C | D | E | F | G |
|---|---|---|---|---|---|---|---|
| 1 | input Tweets | | | | | | |
| 2 | ts | lang | author | content | | len | |
| 3 | 2015-02-24T20:52:40 | en | sasael3asl | Posted a new song; "Wael.j | | 52 =LEN(D3) | |
| 4 | 2015-02-24T20:52:47 | fr | bernardpiv | L'expression \ "sauver les m | | 68 | |
| 5 | 2015-02-24T20:52:50 | de | zitate | Für ein gutes Gespräch sind | | 91 | |
| 6 | 2015-02-24T20:53:05 | de | frankzimm | "Wir haben einen Notfall.Is | | 54 | |
| 7 | 2015-02-24T20:53:16 | en | alex_orlow | I hate finishing a good twee | | 140 =LEN(D7) | |
| 8 | | | | | | | |
| 9 | output TweetLens | | | | | | |
| 10 | ts | avgLen | | | | | |
| 11 | 2015-02-24T20:53:16 | 81.0 | | | | | |
| 12 | =A7 | =AVERAGE(F3:F7) | | | | | |
| 13 | | | | | | | |

COUNT-BASED SLIDING WINDOW, NOT PARTITIONED

FIG. 1

|   | A | B | C | D | E | F | G |
|---|---|---|---|---|---|---|---|
| 1 | input Tweets | | | | | | |
| 2 | ts | lang | author | content | | len | |
| 3 | 2015-02-24T20:52:40 | en | sasael3asl | Posted a new song; "Wael.j | | 52 =LEN(D3) | |
| 4 | 2015-02-24T20:52:47 | fr | bernardpiv | L'expression \ "sauver les m | | 68 | |
| 5 | 2015-02-24T20:52:50 | de | zitate | Für ein gutes Gespräch sind | | 91 | |
| 6 | 2015-02-24T20:53:05 | de | frankzimm | "Wir haben einen Notfall.Is | | 54 | |
| 7 | 2015-02-24T20:53:16 | en | alex_orlow | I hate finishing a good twee | | 140 =LEN(D7) | |
| 8 | | | | | | | |
| 9 | output TweetLens | | | | | | |
| 10 | ts | avgLen | | | | window | |
| 11 | 2015-02-24T20:53:16 | 68.3 | | | | #WINDOW | |
| 12 | =A7 | =AVERAGE(F11) | | | | =WINDOW(F7,300) | |
| 13 | | | | | | | |

TIME-BASED SLIDING WINDOW, NOT PARTITIONED

|   | A | B | C | D | E | F | G |
|---|---|---|---|---|---|---|---|
| 1 | input Tweets | | | | | | |
| 2 | ts | lang | author | content | | len | |
| 3 | 2015-02-24T20:52:40 | en | sasael3asl | Posted a new song; "Wael.j | | 52 | =LEN(D3) |
| 4 | 2015-02-24T20:52:48 | fr | bernardpiv | L'expression \ "sauver les m | | 52 | |
| 5 | 2015-02-24T20:52:56 | de | zitate | Für ein gutes Gespräch sind | | 91 | |
| 6 | 2015-02-24T20:53:02 | de | frankzimm | "Wir haben einen Notfall.Is | | 46 | |
| 7 | 2015-02-24T20:53:16 | en | alex_orlow | I hate finishing a good twee | | 140 | =LEN(D7) |
| 8 | | | | | | | |
| 9 | output TweetLens | | | | | | |
| 10 | ts | | avgLen | | | window | |
| 11 | 2015-02-24T20:53:16 | | 75.8 | | | #WINDOW | |
| 12 | =A7 | | =AVERAGE(F11) | | | =WINDOW(F7,300) | |
| 13 | | | | | | | |

TweetLens

TIME-BASED SLIDING WINDOW, PARTITIONED

FIG. 3

| | A | B | C | D | E | F | G |
|---|---|---|---|---|---|---|---|
| 1 | input Tweets | | | | | | |
| 2 | ts | lang | author | content | | len | |
| 3 | 2015-02-24T20:52:40 | en | sasael3asl | Posted a new song; "Wael.j | | 52 =LEN(D3) | |
| 4 | 2015-02-24T20:52:48 | fr | bernardpiv | L'expression \ "sauver les m | | 52 | |
| 5 | 2015-02-24T20:52:56 | de | zitate | Für ein gutes Gespräch sind | | 91 | |
| 6 | 2015-02-24T20:53:02 | de | frankzimm | "Wir haben einen Notfall.Is | | 46 | |
| 7 | 2015-02-24T20:53:16 | en | alex_orlow | I hate finishing a good twee | | 140 =LEN(D7) | |
| 8 | | | | | | | |
| 9 | output TweetLens | | | | | | |
| 10 | ts | lang | avgLen | | | window | |
| 11 | 2015-02-24T20:53:16 | en | 75.8 | | | #WINDOW | |
| 12 | =SELECT(A7,C15) | =SELECT(B7,C15) | =SELECT(AVERAGE(F11),C15) | | | =WINDOW(F7,300) | |
| 13 | | | | | | | |
| 14 | prev. submitted | | submit? | | | | |
| 15 | 2015-02-24T20:48:15Z | | TRUE | | | | |
| 16 | =PRE(A11,A7,0) | | =A7>A15+300 | | | | |
| 17 | | | | | | | |

TweetLens [LANG:"EN"]

TIME-BASED TUMBLING WINDOW, PARTITIONED

FIG. 4

| | A | B | C | D |
|---|---|---|---|---|
| 1 | input TweetLens | | | |
| 2 | ts | lang | avglen | |
| 3 | 2015-02-2 | la | 83.1 | |
| 4 | 2015-02-2 | en | 75.8 | |
| 5 | 2015-02-2 | mr | 67.2 | |
| 6 | 2015-02-2 | ar | 65.3 | |
| 7 | 2015-02-2 | hu | 77.4 | |
| 8 | | | | |
| 9 | | lang window | lang window | |
| 10 | | #WINDOW =WINDOW(B7,300) | #WINDOW =WINDOW(C7,300) | |
| 11 | | | | |
| 12 | | output TopLens | | |
| 13 | k | lang_k | len_k | |
| 14 | 1 | la =INDEX(B10,MATCH(C14,C10,0)) | 83.1 =LARGE(C10,A14) | |
| 15 | 2 | ja =INDEX(B10,MATCH(C15,C10,0)) | 78.2 =LARGE(C10,A15) | |
| 16 | 3 | de =INDEX(B10,MATCH(C16,C10,0)) | 78.1 =LARGE(C10,A16) | |
| 17 | | | | |

TopLens

TOP-*k* LANGUAGES WITH MOST VERBOSE TWEETS

FIG. 5

```
1   composite TwitterTopK (output TopLens; input Tweets) {
2     type
3       Tweet    = tuple<int64 ts, rstring lang,
4                        rstring author, rstring content>;
5       TweetLen = tuple<int64 ts, rstring lang float64 len>;
6       TopLen   = tuple<rstring lang1, float64 len1,
7                        rstring lang2, float64 len2,
8                        rstring lang3, float64 len3>;
9     graph
10      stream<TweetLen> TweetLens = SpreadSheet(Tweets) };
11       param
12        spreadsheet: "TweetLens.xls";
13        inputs:      { A7=ts, B7=lang, C7=author, D7=content }
14        timeBy:      ts;
15        partionBy;   lang;
16       output
17        TweetLens   ts=Int64("All".), lang=RString("B11"),
18                    len=Float64("C11");
19      }
20      stream<TopLen> TopLens = SpreadSheet(TweetLens) {
21       param
22        spreadsheet: "TopLens.xls"}
23        inputs:      { A7=ts, B7=lang, C7=len };
24        timeBy:      ts;
25       output
26        TopsLangs:   lang1=RString("B14"), lenl=Float64("C14"),
27                     lang2=RString("B15"), lenl=Float64("C15"),
28                     lang3=RString("B16"), lenl=Float64("C16"),
29      }
30  }
```

SPREADSHEET OPERATORS FOR TWITTER IN SPL

FIG. 6

$v ::= \ell \mid \{\ell_1^{t_1}, ..., \ell_n^{t_n}\}$    $f ::= s_0 \mid op(c_1, ..., c_n) \mid \text{SELECT}(c_0, c_1) \mid \text{WINDOW}(c_0, \ell_0) \mid \text{PRE}(c_0, c_1, \ell_0)$ $$\mathcal{T}_{s:\ell}(c,t) = \begin{cases} \{t_0 \in \text{dom}(s_0) \cap [0,t] \mid s(t_0) = \ell\} & \text{if } c \mapsto s_0 \\ \bigcup_{i=1}^{n} \mathcal{T}_{s:\ell}(c_i, t) & \text{if } c \mapsto op(c_1, ..., c_n) \\ \{t_0 \in \mathcal{T}_{s:\ell}(c_1, t) \mid \mathcal{E}_{s:\ell}(c_1, t_0) = \text{TRUE}, \mathcal{T}_{s:\ell}(c_0, t_0) \neq \emptyset\} & \text{if } c \mapsto \text{SELECT}(c_0, c_1) \\ \mathcal{T}_{s:\ell}(c_0, t) & \text{if } c \mapsto \text{WINDOW}(c_0, \ell_0) \\ \mathcal{T}_{s:\ell}(c_1, t) & \text{if } c \mapsto \text{PRE}(c_0, c_1, \ell_0) \end{cases} \qquad \text{deps}(c) = \begin{cases} \emptyset \\ \{c_1, ..., c_n\} \\ \{c_0, c_1\} \\ \{c_0\} \\ \{c_1\} \end{cases}$$

$$\mathcal{E}_{s:\ell}(c,t) = \begin{cases} s_0(\max(\mathcal{T}_{s:\ell}(c,t))) & \text{if } c \mapsto s_0 \text{ and } \mathcal{T}_{s:\ell}(c,t) \neq \emptyset \\ op(\mathcal{E}_{s:\ell}(c_1,t), ..., \mathcal{E}_{s:\ell}(c_n,t)) & \text{if } c \mapsto op(c_1, ..., c_n) \text{ and } \mathcal{T}_{s:\ell}(c,t) \neq \emptyset \\ \mathcal{E}_{s:\ell}(c_0, \max(\mathcal{T}_{s:\ell}(c,t))) & \text{if } c \mapsto \text{SELECT}(c_0, c_1) \text{ and } \mathcal{T}_{s:\ell}(c,t) \neq \emptyset \\ \{\mathcal{E}_{s:\ell}(c_0, t_0) \mid t_0 \in \mathcal{T}_{s:\ell}(c,t) \cap (\max(\mathcal{T}_{s:\ell}(c,t)) - \ell_0, t]\} & \text{if } c \mapsto \text{WINDOW}(c_0, \ell_0) \text{ and } \mathcal{T}_{s:\ell}(c,t) \neq \emptyset \\ \mathcal{E}_{s:\ell}(c_0, \text{prev}(\mathcal{T}_{s:\ell}(c_1, t))) & \text{if } c \mapsto \text{PRE}(c_0, c_1, \ell_0) \text{ and } |\mathcal{T}_{s:\ell}(c,t)| \geq 2 \text{ and } \mathcal{T}_{s:\ell}(c_0, \text{prev}(\mathcal{T}_{s:\ell}(c_1,t))) \neq \emptyset \\ \ell_0 & \text{if } c \mapsto \text{PRE}(c_0, c_1, \ell_0) \text{ and } |\mathcal{T}_{s:\ell}(c,t)| \geq 2 \text{ and } \mathcal{T}_{s:\ell}(c_0, \text{prev}(\mathcal{T}_{s:\ell}(c_1,t))) = \emptyset \\ \ell_0 & \text{if } c \mapsto \text{PRE}(c_0, c_1, \ell_0) \text{ and } |\mathcal{T}_{s:\ell}(c,t)| = 1 \\ \bot & \text{if } \mathcal{T}_{s:\ell}(c,t) = \emptyset \end{cases}$$

$$\mathcal{T}_s(c,t) = \bigcup_\ell \mathcal{T}_{s:\ell}(c,t) \qquad \mathcal{E}_s(c,t) = \mathcal{E}_{s:s(\max(\mathcal{T}_s(c,t)))}(c,t) \text{ if } \mathcal{T}_s(c,t) \neq \emptyset$$

Formal semantics; $\ell$ is a literal, $t$ is a timestamp, $s$ is a stream, $c$ is a cell, and $op$ is an operator.

FIG. 7

SPREADSHEET COMPILATION IN THE CONTEXT OF SPL

STREAM GRAPH WITH SPREADSHEET OPERATOR

STREAM GRAPH WITH PARALLEL SPREADSHEET OPERATOR

|   | A | B | C | D | E | F | G |
|---|---|---|---|---|---|---|---|
| 1 | input Trades | | | | | | |
| 2 | sym | price | vol | | price*vol | | |
| 3 | "ACME" | 166.78 | 2,740 | | 456,997 | =B3*C3 | |
| 4 | | | | | | | |
| 5 | | | vol window | | price*vol window | | |
| 6 | | | #WINDOW | =WINDOW(C3,300) | #WINDOW | =WINDOW(E3,300) | |
| 7 | | | | | | | |
| 8 | | | vol sum | | price*vol sum | | |
| 9 | | | 49,853,21 | =SUM(C6) | 8,368,859,874 | =SUM(E6) | |
| 10 | input Quotes | | | | | | |
| 11 | sym | price | | | | | |
| 12 | "ACME" | 165.88 | | | | | |
| 13 | | | | | | | |
| 14 | | | vwap | | bargain? | | |
| 15 | | | 167.87 | =C6/E9 | TRUE | =B12<C15 | |
| 16 | | | | | | | |
| 17 | output Bargains | | | | | | |
| 18 | sym | price | vwap | | | | |
| 19 | "ACME" | 165.88 | 167.87 | | | | |
| 20 | =SELECT(A12,E15) | =SELECT(B12,E15) | =SELECT(B12,E15) | | | | |
| 21 | | | | | | | |

Bargains [sym: "ACME"]

VWAP SPREADSHEET OPERATOR

FIG. 11

```
1  composite Vwap(output Bargains; input Trades, Quotes)
2  type
3   Trade    = tuple<int64 ts, rstring sym, float64 price,
4                    float64 volume>;
5   WTrade   = tuple<int64 ts, rstring sym, float64 price,
6                    float64 volume, boolean isinsert>;
7   Vwap     = tuple<int64 ts, rstring sym, float64 vwap>;
8   Quote    = tuple<int64 ts, rstring sym, float64 price>;
9   Bargain  = tuple<int64 ts, rstring sym, float64 price,
10                   float64 vwap>;
11
12 graph
13  stream<WTrade> WTrades = Window(Traqg__s) {
14   window
15    Trades: sliding, delta(ts, 300), count(1), partitioned;
16   param
17    partitionBy: sym;
18   output
19    WTrades: isinsert=Isinsert();
20 }
21
22  Stream<Vwap> Vwaps = Custom(WTrades) {
23   logic
24    state : {
25     mutable map<rstring, float64> sumPV;
26     mutable map<rstring, float64> sumV;
27    }
28    onTuple WTrades : {
29     if ( ! ( sym in sumPV) )
30      sumPV[sym] = 0.0;
31      sumV[sym] = 0.0;
32     }
33     if (isinsert)  {
34      sumPV[sym] += price* volume;
35      sumV[sym] += volume;
36      submit({ts=ts, sym=sym, vwap=sumPV[sym]/sumV[sym] },
37             Vwaps) ;
38     } else {
39      sumPV[sym] -= price* volume;
40      sumV[sym] -= volume;
41     }
42    }
43   }
44
45   stream<Bargain> Bargains= Join(Vwaps; Quotes) {
46    window
47     Vwaps:  sliding, count(1), count(1), partitioned;
48     Quotes: sliding, count(1), count(1), partitioned;
49    param,
50     equalityLHS:    Vwaps.sym;
51     equalityRHS:    Quotes.sym;
52     partitionByLHS: Vwaps.sym;
53     partitionByRHS: Quotes.syrn;
54     match:          Price < vwap;
55    output
56     Bargains:       ts=Quotes.ts;
57  }
58 }
```

VWAP IN SPL

FIG. 12

SPREADSHEET COMPILER FOR STREAM PROCESSING

CROSS-REFERENCE TO RELATED APPLICATION

This application is related to application Ser. No. 15/018,680, for "Encoding A Spreadsheet Program For Stream Processing", filed herewith, the entire contents and disclosure of which are hereby incorporated herein by reference.

BACKGROUND

The invention generally relates to a spreadsheet compiler, and more specifically, to a spreadsheet compiler for stream processing.

Continuous data streams arise in many different domains: finance, health care, telecommunications, and transportation, among others. Stream processing is a programming paradigm that allows the analysis and aggregation of these data streams as they are being produced. This is very useful since the data streams represent such a high volume of data that it is prohibitively expensive to persist on disk.

Many organizations deploy stream processing systems for various application domains that include finance, health care, telecommunications, and transportation. Stream processing is a programming paradigm that allows the analysis and aggregation of voluminous data streams, and often in real-time.

In large streaming systems, domain experts may have limited programming experience to directly implement their desired solutions. As a result, the domain experts rely on developers for the actual implementation, and this gap is a limitation for any organization.

SUMMARY

Embodiments of the invention provide a method, system and computer readable program product for compiling a spreadsheet to execute stream processing in a computing system, the spreadsheet having a function encoded therein. In an embodiment, the method comprises extracting the function from the spreadsheet, said function supporting data windows and stream partitioning in the computing system; and identifying input cells of the spreadsheet for holding input values for the function, and identifying output cells of the spreadsheet for holding output values of the function.

In embodiments of the invention, the stream partitioning includes partitioning a data stream into a plurality of data stream partitions, and the method further comprises applying the extracted function to the plurality of data stream partitions.

In embodiments of the invention, the applying the extracted function to the plurality of data stream partitions includes applying the extracted function to the plurality of data stream partitions in series.

In embodiments of the invention, the applying the extracted function to the data stream partitions includes applying the extracted function to the data stream partitions in parallel to parallelize computations over said stream partitions.

In embodiments of the invention, the extracted function includes a plurality of formulas, and the applying the extracted function to the plurality of data stream partitions includes processing each of the data stream partitions according to one of the formulas.

In embodiments of the invention, the processing each of the data stream partitions according to one of the formulas includes processing each of the data stream partitions according to a respective one of the formulas.

In embodiments of the invention, the windows are time based windows and collect values in a given data stream from specified time intervals moving over time.

In embodiments of the invention, the windows are count based windows and collect a specified number of values in a given data stream.

In embodiments of the invention, the windows have variable sizes.

In embodiments of the invention, the spreadsheet has a plurality of functions encoded therein, and the extracting the function from the spreadsheet includes extracting the plurality of functions from the spreadsheet.

Embodiments of the invention enable the domain experts to participate directly in the development of complex streaming applications. In doing so, the domain experts can apply their domain knowledge to evolve, refine, and customize data analysis in a streaming application.

Embodiments of the invention provide a spreadsheet operator that may be composed with other stream processing operators to form a complete program. These spreadsheet operators provide an easy-to-use computation platform.

Embodiments of the invention provide ways to overcome the finite nature of the spreadsheet by first augmenting spreadsheets with support for time-based windows. Windows are treated as first-class constructs and are decoupled from the existing graphical representation. An individual cell can now represent either a very large count-based window (e.g., millions of rows of data), or a time-based window that is variable in size and specified using the passage of time.

Embodiments of the invention also provide a mechanism for specifying partitioning, that is, performing the same computation for different keys of a possibly large or unknown data set. The user specifies the partitioning criterion and the spreadsheet client only displays the computation for select examples of keys. The spreadsheet operator is comprised of the spreadsheet together with the meta-data involved in describing partitioning.

These features result in an easy-to-use, high-level programming model. The performance of the spreadsheet operator (with compilation to C++) is much higher than performing all computations within the spreadsheet.

Embodiments of the invention provide a spreadsheet operator that supports time-based windows and partitioning, formal semantics for the spreadsheet operator, and a spreadsheet compiler to C++ with optimizations that incrementalize computation over windows.

DRAWINGS

FIG. 1 illustrates a count-based sliding window stream processing operation, where the stream is not partitioned.

Figure 2A:
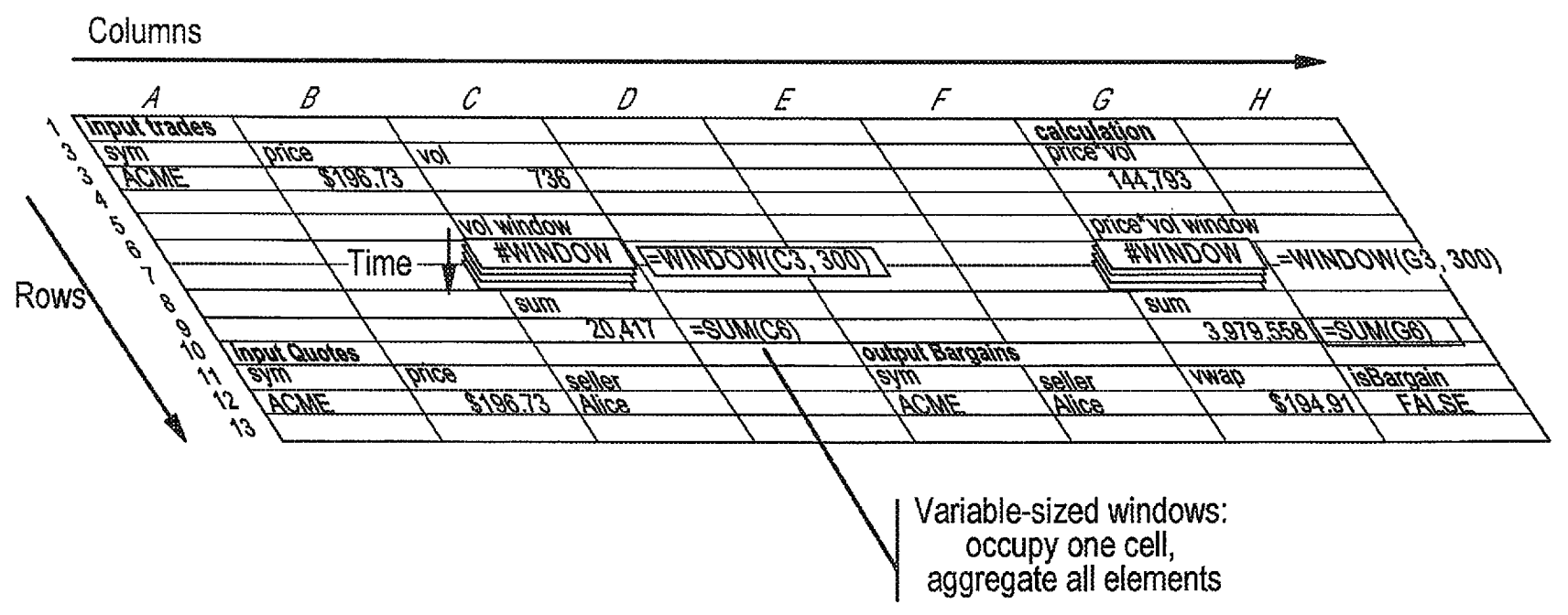

FIG. 2 illustrates a time-based sliding window stream processing operation, where the stream is not partitioned.

FIG. 2A shows variable-sized windows that may be used with the procedure of FIG. 2.

FIG. 3 illustrates the use of time-based sliding window with a partitioned data stream.

FIG. 4 shows the use of time-based tumbling windows with a partitioned data stream.

FIG. 5 illustrates an example of a spreadsheet operator in an embodiment of the invention.

FIG. 6 depicts a group of spreadsheet operators in an embodiment of the invention.

FIG. 7 shows formal semantics that may be used in embodiments of the invention.

FIG. 11 shows a spreadsheet operator used in an example of the invention.

FIG. 12 shows SPL code corresponding to the spreadsheet operator of FIG. 11.

DETAILED DESCRIPTION

Figure 3A:
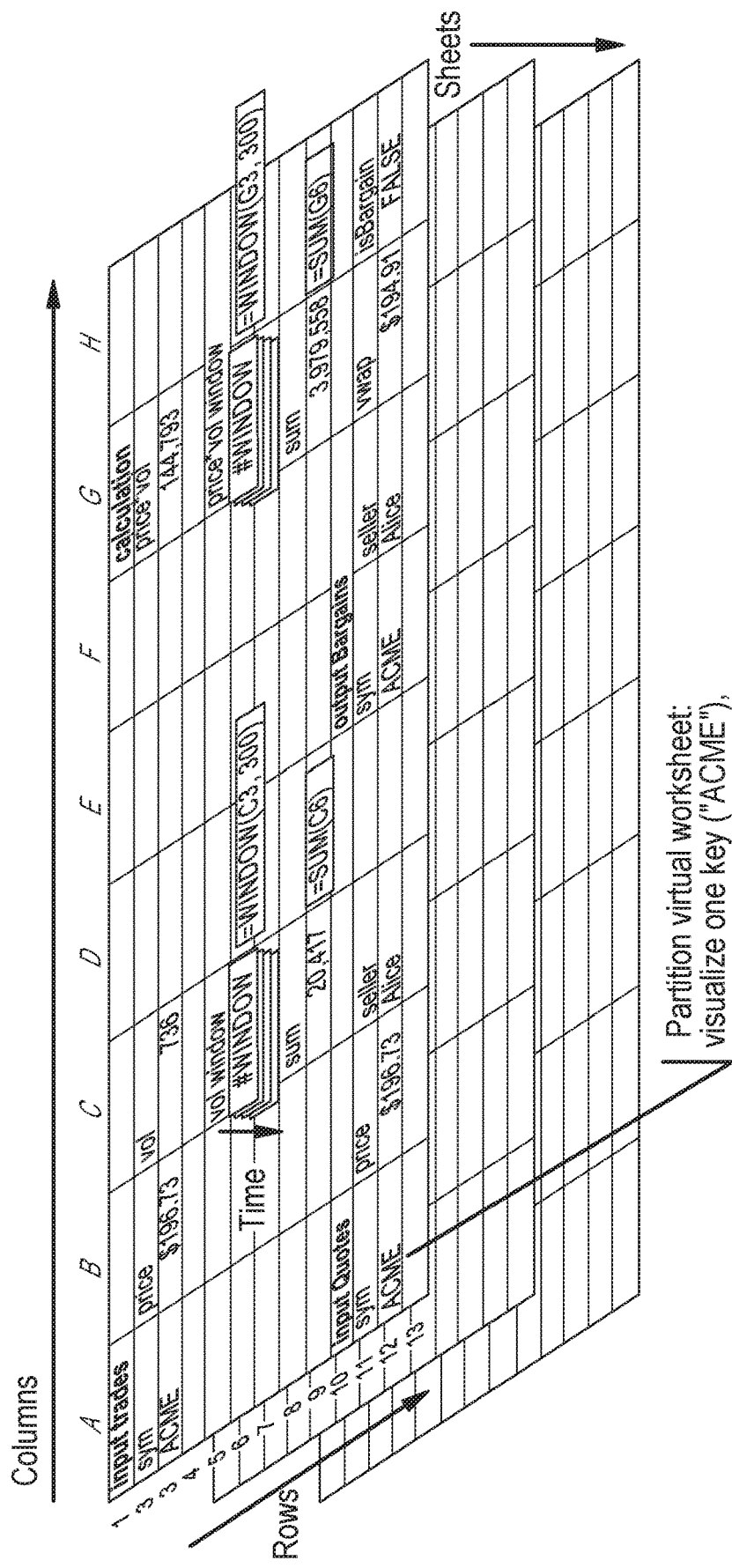
FIG. 3A depicts a partitioned virtual worksheet that may be used with the procedure of FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method, system and computer program product for using spreadsheet operators for stream processing. Embodiments of the invention overcome the finite nature of the spreadsheet by augmenting spreadsheets with support for time-based windows, and by providing a mechanism for specifying partitioning, that is, performing the same computation for different keys of a possibly large or unknown data set. An individual cell of a spreadsheet can represent either a very large count-based window or a time based window that is variable in size and specified using the passage of time. Also, the user specifies the partitioning criterion and the spreadsheet client only displays the computation for select examples of keys. The spreadsheet operator is comprised of the spreadsheet together with the meta-data involved in described partitioning.

The following discussion gives an overview of an embodiment of the invention using an application that analyzes Twitter data and computes the top-k languages with the most verbose tweets over 5 minute windows. The application is comprised of two spreadsheet operators: the first calculates the average length of tweets for every language in a 5-minute time-frame, and the second sorts these to display the top-k languages with the most verbose tweets. FIGS. 1-4 show how an end-user might build the first spreadsheet operator step-by-step, and FIG. 5 shows the second operator. FIG. 2A shows variable-size windows that may be used with the procedure of FIG. 1-4, and FIG. 3A illustrates partitioned virtual worksheets that may be used with this procedure.

FIG. 1 shows how to compute the average length of a tweet. Rows 3-7 contain tweet data: a timestamp, the language for the text, the Twitter id of the author, and the tweet itself. In column F, and in cell B11 standard Excel functions (LEN and AVERAGE) are used to calculate the length of each tweet and the average length for all tweets shown, respectively. Let cells A7 through D7 represent new inputs to the spreadsheet from a streaming source. On each incoming tweet, which is referred to herein as a tick, the data in these cells is updated and dependent cells are recalculated. Similarly, let cells A3 through D6 represent a history of tweets—these are previous tweets that entered the spreadsheet. In this way, FIG. 1 shows how to compute over a small count-based sliding window.

FIG. 2 shows the same spreadsheet operator augmented to compute averages over a time-based sliding window spanning 300 s (5 minutes). The inputs are the same (cells A7 to D7) and the length of tweets are computed similarly in column F. Cells A3 through D6 show a bit of history as before, but these are no longer used for computing averages. Cell F11 contains a 300 s time-based window over cell F7 (WINDOW(F7,300)). This means that as values appear in F7 they are recorded to form a 300 s window. Values are evicted based on their timestamp. Each cell in the spreadsheet has an implicit timestamp: inputs have a timestamp defined outside of the spreadsheet (see FIG. 6), and all other cells get a timestamp based on their dependencies. If the spreadsheet client is slowed down, the window operator still denotes the same collection of data because it is computed based on the given timestamps. Windows in this programming model are first class entities and can be used in formulas. These windows overcome the finite nature of the spreadsheet interface and allow computations over unbounded data sets.

The spreadsheet of FIG. 2 does not differentiate languages when computing averages, but an average for each language needs to be computed. FIG. 3 shows the same spreadsheet operator augmented with partitioning based on language. Only tweets written in English are shown in this spreadsheet (all the values in column B are en). To indicate this partitioning, the tab of the spreadsheet is labeled with [lang: "en"], which is the partitioning key for this spreadsheet, and is specified as part of the operator's definition. To simplify the programming model, there is only one partitioning key per spreadsheet. If the user wishes to compute with different partitions, the user can use different spreadsheet operators. Partitioning effectively allows a universal quantification: the computation specified is performed for all languages, allowing the implementation to use parallelism. The results of all these computations are recombined to form the output stream of the spreadsheet operator. Partitioning also allows the user to focus on a single key (in this case all English tweets) and program by example. The operator now outputs the language corresponding to each average (cells A11 to C11).

In FIG. 3, the spreadsheet operator recomputes the corresponding average every time a new tweet comes in. However, a single average value needs to be outputted every 300 s for each language that appeared in that 300 s time-frame. FIG. 4 augments the operator with a tumbling window to accomplish this. Cells A11 to C11 contain the output of the spreadsheet, comprised of a timestamp, a language, and the average length of tweets for that language. The user needs to specify when to emit these tuples, thereby defining a tumbling window. Cell C15 determines when to submit a new output and this flag is used in the SELECT calls in the output cells. SELECT(A7,C15) takes on the value of A7 when C15 is true. Every time the output cells are updated, cell A15 holds the previous value of A11 (formula PRE(A11,A7,0)), which in turn is used to compute when to emit again in C15. If the current timestamp (A7) is greater than the previous time at which output was emitted (A15) plus 300 s, the operator needs to emit again. The formula PRE(A11,A7,0) records the previous value of A11 every time A7 changes, and has initial value 0. This construct supports specifying stateful computations in the spreadsheet. The use of PRE and SELECT to determine when to emit outputs is a very useful idiom.

FIG. 5 shows the second spreadsheet operator in this example. The second spreadsheet operator takes the recombined output of the first operator and sorts this output to display the top-k languages with most verbose tweets. Cells A7 through C7 are the input cells and show the average length of tweets for each language. Cells A3 through C6 show a bit of history of the incoming inputs. The first spreadsheet produced one tuple per language that appeared in each 300 s time-frame (with respect to the timestamps of these tuples). Since the timestamps span a 300 s time-frame, taking a window of 300 s with respect to these timestamps will guarantee that all of them will be considered for sorting. Cells B10 and C10 define 300 s windows on the inputs. The table in cells B14 through C16 shows the result of the sorting and provide the output of the second spreadsheet operator. These cells contain standard Excel functions that are now defined on windows. LARGE calculates the k-th largest value in a range. Note that cells A14 to A16 contain constants. MATCH searches for a specified item in a range of cells and returns the relative position of that item in that range, and INDEX returns a value from within a range given and index.

FIG. 6 shows the SPL code [M. Hirzel, H. Andrade, B. Gedik, G. Jacques-Silva, R. Khandekar, V. Kumar, M. Mendell, H. Nasgaard, S. Schneider, R. Soul'e, and K.-L. Wu. IBM Streams Processing Language: Analyzing big data in motion. IBM Journal of Research & Development, 57(3/4):7:1-7:11, 2013] that configures the spreadsheet operators and composes them into a graph. This code defines the inputs and outputs of each spreadsheet, specifies how the inputs and outputs are connected (that the output of the first goes into the second), and specifies partitions and timing. Lines 3 to 8 define the types used in the program: Tweet, TweetLen, and TopLen. These type the inputs of the first and second spreadsheets, and the output of the second spreadsheet, respectively. Lines 10 to 19 configure the first operator: its inputs are given in cells A7 through D7, its timestamp is given by the is attribute, and it is partitioned by lang. The second spreadsheet operator is configured similarly and takes the output of the first as input.

Although this program requires knowledge of the SPL programming language, the end-users do not need to write these code snippets. Instead a developer may put together a program and leave the spreadsheet operators as opportunities for deep computational customization by an end-user with limited programming experience.

The compiler takes each spreadsheet definition (e.g., a Microsoft Excel file) and generates C++ code from each spreadsheet definition, which in turn gets wrapped into an SPL operator. The complete program can then be compiled using SPL. Time-based windows are treated incrementally to achieve higher performance.

The compiler implementation supports Microsoft Excel files augmented in the ways described herein.

Formal Semantics

The following discussion formalizes streams and spreadsheet operators.

Streams are sequences of values with timestamps. Values can either be scalars or windows of data. A spreadsheet operator is a collection of cells containing formulas. Formulas combine references to input streams and cells—cyclic references are discussed below—to compute new streams using operators such as filtering, windowing, and aggregation functions. These computed streams are the output streams of the spreadsheet operator.

Spreadsheet operators are reactive agents. A formula is (re)computed only when one of the streams or cells it refers to is updated, i.e., arrival of a new value on a stream or recomputed cell. Values are persistent. A cell retains the last computed value until the next computation.

Spreadsheet operators are synchronous agents. They adopt the approach of synchronous languages. The timestamp attached to the value computed by a formula is simply the timestamp of the event that triggers the (re)computation, with no delay.

A spreadsheet operator has one special input stream—the partitioning stream—e.g., the language of a tweet. All input streams are partitioned according to the current value of the partitioning stream—the key—e.g., English, French, etc. The formulas are computed for each key independently, e.g., average length of English tweets in the last 300 seconds, number of French tweets, etc. The output streams are obtained by merging the computed values for all keys in order. So the "average tweet length in 300 s" formula outputs for each input tweet the average length of tweets in the same language in the last 300 s. If the partitioning stream is a constant stream, then this partitioning scheme is a no-op.

Definitions.

Let a tick T be a possibly empty, possibly infinite sequence of natural numbers $\{t_1, t_2, \ldots\}$ denoting timestamps, e.g., microseconds since midnight. A non-empty finite tick T always admits a maximal element max (T). Given a finite tick T with at least two elements, we define the second-to-max element prev(T).

Let a value v be either a literal l or a window—a finite, possibly empty set of literals with pairwise distinct timestamps: $\{l_1^{t_1}, \ldots, l_n^{t_n}\}$.

Let a stream s be a map from a tick to values. We write dom(s) for the tick of s and s(t) for the value of s at time t. We say that s ticks at time t if $t \in dom(s)$. For convenience, if $t \notin dom(s)$ but $t \geq min(dom(s))$, we write s(t) for the most recent value of s at time t, i.e., $s(max(dom(s) \cap [0, t]))$. A stream or cell value is absent before its first tick, denoted by $\bot$.

Timestamps are an implicit and intrinsic part of all streams. Streams of tuples can be encoded as multiple streams—one per component of the tuple—with the same tick.

Spreadsheet Operators.

Let a spreadsheet operator S be a finite collection of cells. Each cell has a unique name c and a formula f. We write $c \mapsto f$ if cell c maps to formula f.

The syntax of formulas is specified in FIG. 7 where op denotes a family of operators on values (such as division /, greater-than >, or Excel's IF or SUM functions). For simplicity, nesting operators are not formalized and constant formulas are modeled implicitly by means of constant streams. Moreover, operators on scalars are not distinguished from operators on windows, and it is assumed that operators can operate on absent values but do not return the absent value.

Partitions.

The semantics of a spreadsheet operator S is defined as a function of its partitioning stream s (e.g. lang). FIG. 7 first specifies the tick of cell c up to time t—$T_{s;l}(c,t)$—and the value of c at time t—$E_{s;l}(c,t)$—for the partition key l (e.g., en). These definitions are discussed in detail later. The tick and values of c—$T_s(c, t)$ and $E_s(c,t)$—are then obtained by combining the ticks and values for all keys. The tick of c is simply the union of the ticks of c for all keys. The value of c at time t is the most recently computed value for c across all keys.

The partitioning stream s and key l only appear in the specification of $T_{s;l}(c,t)$ when c maps to an input-stream formula $s_0$. The condition $s(t_0)=l$ simply masks the ticks of $s_0$ that occur while the (most recent) value of s is not l. By induction on the structure of formulas, for any cell c, if $t_0 \in T_{s;l}(c,t)$ then $s(t_0)=l$.

In a sense, this semantics maintains one "virtual" instance of the spreadsheet operator for each key. At any point in time, only the instance corresponding to the current key receives new input values and is updated accordingly (due to the $s(t_0)=l$ filter). The other instances lie dormant and unchanged. The "real" spreadsheet operator collects all the updates from all the virtual instances by merging them in order. Values computed for distinct keys have distinct timestamps, hence the ordered merge is unambiguously defined.

Another equivalent interpretation of this specification is that all cells in the spreadsheet operator persist not just a single value, but rather a map from partition keys to values.

The above-discussed approach to partitioning guarantees partition isolation, i.e., the combination of two properties: spatial isolation and temporal isolation.

Spatial isolation: computations for distinct keys do not depend on one another. Values computed with respect to a specific key only depend on values previously computed for the same key. Temporal isolation: computations for distinct keys do not overlap. One input value can only trigger computation for one key (the current key).

While the amount of state in a spreadsheet operator depends on the number of keys, the amount of computation does not. Moreover, the state is partitioned by keys and the parts can be maintained independently from one another.

Discussed below is the specification of $T_{s;l}(c,t)$ and $E_{s;l}(c,t)$ and the constructs of a calculus used in embodiments of the invention.

Operators.

An operator op ticks when any operand does. The operator computes using the most recent values of the operands. E.g., "SUM($c_0, \ldots, c_n$)" is the sum of the most recent values of the cells $c_0, \ldots, c_n$ where an absent value is interpreted as zero. The operator returns a value unless all operands are absent.

SELECT.

The SELECT construct filters a stream according to a condition—SELECT($c_0,c_1$) ticks when $c_1$ does and evaluates to TRUE returning the most recent value of $c_0$. For instance, if $c_0 \mapsto s_0$ and $c_1 \mapsto c_0 > 0$ and $c_2 \mapsto$ SELECT($c_0,c_1$) then $c_2$ streams the positive values in $s_0$.

WINDOW.

The WINDOW construct collects the most recent values of a stream: WINDOW($c_0,l_0$) ticks at time t if $c_0$ does, and captures at time t the values of $c_0$ with their respective timestamps in the last $l_0$ time units.

Because the duration of a window is a statically known constant value, windows can be maintained incrementally by appending new values and evicting old values. Since WINDOW ($c_0, l_0$) is only computed when $c_0$ ticks, old values are only evicted upon the arrival of new values. For example, if $c_0$ ticks at time 0, 10, 20, 30, etc. and cell $c_1$ maps to formula WINDOW ($c_0$,15), then $c_1$ is only computed at time 10n. For example, if $c_1$ is read at time 28, it still contains the value of $c_0$ at time 10 since 28 mod 10-15<10. In other words, while a window will never contain more than $l_0$ time units worth of data, this data might be outdated when used in combination with faster-paced streams. Formally, WINDOW($c_0,l_0$) at time t contains the values of $c_0$ from time interval $(t_0-l_0, t_0]$ where $t_0$ is the most recent tick of $c_0$ or, as equivalently specified in FIG. 7, from time interval $(t_0-l_0,t]$ since $c_0$ emits no value in $(t_0, t]$.

While such "lazy" eviction might be surprising at first, "eager" eviction based on timeouts has more drawbacks than benefits. On the one hand, timeouts break partition isolation, making it possible for computations to take place at the same time for distinct keys, possibly leading to computing synchronous, hence conflicting values across keys. On the other hand, lazy eviction can be "accelerated" by making the input to the window tick more often.

PRE.

The PRE construct makes it possible to record values—PRE($c_0,c_1,l_0$) ticks when $c_1$ does returning the value of $c_0$ at the previous tick of $c_1$. If $c_1$ ticked only once so far or $c_0$ was absent at the previous tick of $c_1$, it returns $l_0$ instead.

State machines can be constructed using PRE to create feedback loops, for instance to derive the value of a cell from the previous value of the same cell. Cyclic definitions however are not always sensible.

Formally, a spreadsheet operator S is well-formed if the directed graph G of immediate dependencies in S is acyclic, where the vertices of G are the cells in S and there exists an edge (c,c') in G if c'∈deps(c) (see FIG. 7). The ticks and values up to time t of the cells of a well-formed spreadsheet operator S are defined via a well-founded recursion from the ticks and values of the input streams of S up to time t.

We adopt the same approach in this work and simply add that a window has an immediate dependency on its argument: deps(c)=$c_0$ if c↦ WINDOW ($c_0,l_0$). Because of this immediate dependency WINDOW cannot replace PRE to build spreadsheet with cyclic dependencies. While both constructs encapsulate memory, they serve very different purposes: PRE with its built-in delay is meant for feedback loops whereas WINDOW is intended for on-the-fly data aggregation.

The semantics of a spreadsheet operator can be computed incrementally over time. Informally, at each tick t of an input stream, the set of cells to recompute and the resulting values depend only on the input values at time t and the current state of the spreadsheet—the values of the cells and the values stored by each occurrence of PRE.

The space and time complexity of the incremental computation can be large because of partitions and windows. Large numbers of keys and large windows can result in a lot of data. Computing aggregation operators can therefore become a bottleneck. As discussed in more detail below, embodiments of the invention parallelize computations across partitions and incrementalize computations over windows to mitigate the cost of these capabilities.

Spreadsheet Compilation

Discussed below is a compiler that implements the formal semantics discussed above.

The user writes a spreadsheet and describes where it fits in a larger stream program, i.e., how it connects to other upstream and downstream operators. To support end-users, a simple harness may be pre-defined or auto-generated to input data into and output data from the spreadsheet. Embodiments of the invention described herein use stream programs written in SPL, but the approach could be adapted to other streaming languages. A stream program describes a directed graph of streams and operators. Each stream is a conceptually infinite ordered sequence of tuples, where a tuple is a record with named attributes. Each operator is a source, a sink, or a stream transformer. The program configures the operators and arranges them in a graph.

FIG. 6 shows two examples for how to configure the spreadsheet operator for the stream graph. Looking at the first example, Line 10 connects the operator to an output stream TweetLens and an input stream Tweets. Line 12 names the file containing the actual spreadsheet from FIG. 4. Line 13 assigns attributes of input tuples to spreadsheet cells. Line 14 identifies the attribute serving as timestamp for time-based windows, and Line 15 identifies the attribute serving as partitioning key. Finally, Lines 17-18 assign spreadsheet cells to attributes of output tuples. Note that timestamps and keys need only be specified when the user wants to take advantage of time-based windows and partitioning, respectively: the second example in FIG. 6 is not partitioned and omits partitionBy. The SPL development environment provides wizards for configuring operators without having to enter the SPL code by hand.

Figure 8:
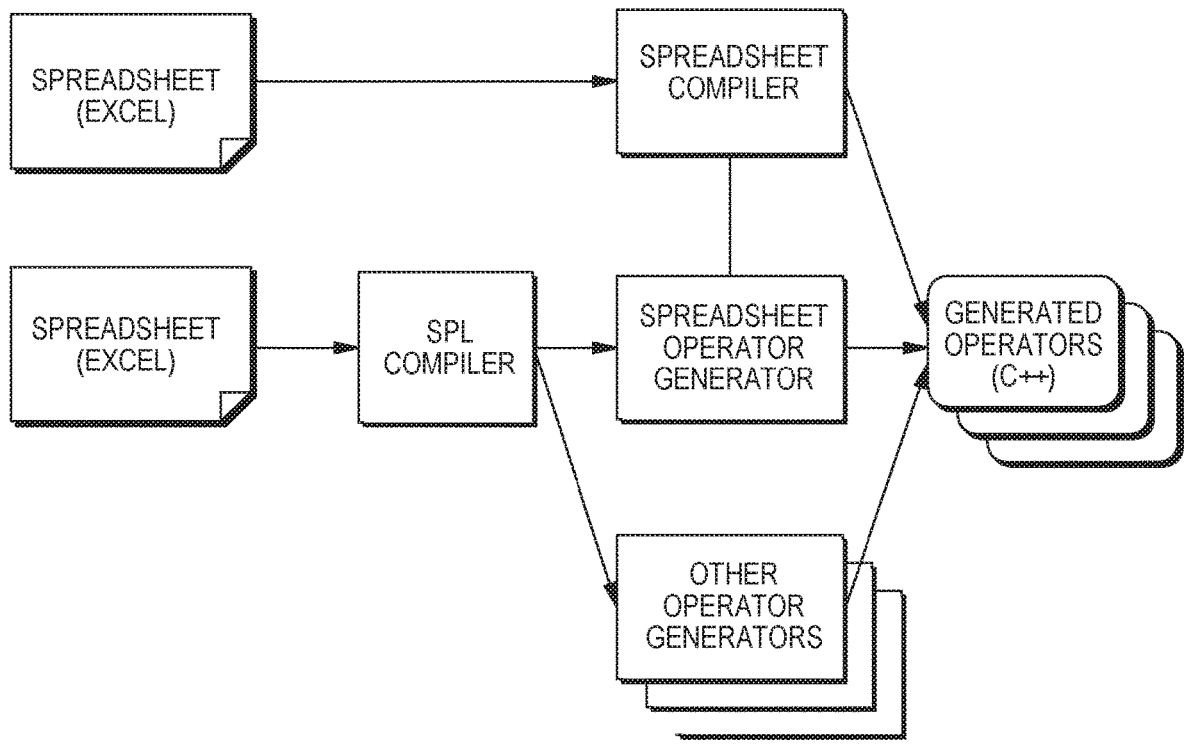
FIG. 8 illustrates spreadsheet compilation in the context of Stream Processing Language.

The spreadsheet compiler, described below, is independent of SPL. The compiler reads the spreadsheet file, and generates optimized C++ code for it. FIG. 8 depicts how the spreadsheet compiler is used in the context of SPL. The SPL compiler is extensible with a library of operator generators; in other words, it parses the SPL program and performs some checks, but delegates the compilation of individual operators to the corresponding code generators. Specifically, when the SPL compiler encounters a use of the spreadsheet operator, the compiler invokes the spreadsheet operator generator. The spreadsheet operator generator checks and resolves names and types of parameters and input/output assignments. If there are no errors, the spreadsheet operator generator invokes the spreadsheet compiler. In addition, the spreadsheet operator generator generates surrounding code for calling the cell setters, cell getters, and computing functions produced by the spreadsheet compiler. The resulting code is then linked with the C++ code produced by all the operator generators and with the SPL runtime library to yield binaries that can execute on either a single machine (typically a multi-core) or on a cluster of machines.

Design Considerations

Overall, the spreadsheet compilation is faithful to the formal semantics discussed above. Conventional spreadsheet functions (represented by op in the semantics) are pure and deterministic. Most spreadsheet processors come with rich function libraries, but a small subset accounts for most practical uses. Computed cell references are only supported via Excel's INDEX, VLOOKUP, and MATCH functions, all other references must use explicit cell names.

The supported types are floating point numbers, strings, Booleans, and errors. As is typical in spreadsheet processors, functions are total and handle all types, producing or forwarding error values as needed. The calculus constructs PRE, WINDOW, and SELECT are exposed to the spreadsheet programmer as new functions. A check is made at compile time that results of invocations of WINDOW can only flow into aggregation functions that return a simple scalar, such as SUM, COUNT or AVERAGE. This means that consistently with the formal calculus, windows cannot nest, and can be thought of as enforcing a simple type system on functions.

In embodiments of the invention, the calculus and implementation rely on universal partitioning, where either no input streams are partitioned, or all input streams are partitioned using the same key type. Universal partitioning is sufficient but not necessary for partition isolation, where inputs for a key have no observable effect on outputs for a different key. This enables an implementation where partitioning is handled entirely by the operator in the stream graph, and the spreadsheet compiler is oblivious to it. Note that different operators in the stream graph can be partitioned differently, as is the case in FIG. 6.

Timestamps needed by time-based windows are given by attributes of input tuples. All attributes of a single tuple are synchronous with each other. The tick of an output is defined as specified in the formal semantics discussed above. In particular, upon a given input, not all outputs necessarily tick. The ticking outputs are determined by static dependencies (cell references) and dynamic dependencies (uses of SELECT). In embodiments of the invention, the implementation submits an output tuple if at least one of the cells feeding its attributes ticks.

The calculus and implementation rely on universal time, where time is strictly monotonically increasing across all input streams. Universal time is easy to establish in the common case where there is only a single input stream, but is inherently difficult when there are multiple input streams, such as Trades and Quotes for computing a bargain. This difficulty stems from clock skew in distributed systems: timestamps of tuples from different remote sources cannot be assumed to be based on the same clock.

This problem is well-recognized in the streaming literature, and there are different solutions. One solution is to wait for tuples that are slightly out of order, while dropping and logging tuples that are substantially out of order. There are other cases where the problem is easier to solve; for instance, if input streams lack a sender-assigned timestamp attribute, the receiver can inject timestamps satisfying universal time. External time management is orthogonal to spreadsheet compilation. Embodiments of the invention use test input streams that satisfy universal time by construction. To support different time management solutions, the Spreadsheet operator can be configured to either fire immediately on each tuple, or to only use tuples for setting input cells, but delay firing until punctuations.

Spreadsheet Compiler

In embodiments of the invention, the spreadsheet compiler is implemented as a Java application that consumes a spreadsheet in Microsoft Excel format and generates a C++ class that stores the state of the sheet and can replicate its computation. The compiler also requires as arguments a specification of input and output cells. The input cells are passed as a list of lists, representing the mapping of input streams, each with its own list of attributes, to cells in the spreadsheet.

Architecture.

The compiler front-end leverages the Apache POI library [Apache POI. The Apache POI project. http://poi.apache.org. Retrieved November, 2014.] to process Excel spreadsheets in their original (e.g., binary) format. After parsing, spreadsheets are internally represented as sets of key-value pairs. The compiler applies a series of standard phases (expression flattening, constant propagation, and dead code elimination), introducing additional synthetic cells when necessary. For example, B14=INDEX(B10, MATCH(C14,C10,0)) in FIG. 5 is flattened to B14a=MATCH(C14,C10,0) and F8=INDEX(B10,B14a).

After normalization, the compiler computes, for each cell, a conservative over-approximation of the set of input streams for which it ticks. In the absence of SELECT, this set can be computed exactly; but after SELECT, an output cell may dynamically skip a tick of an input cell that the output cell depends upon statically. The computation follows the semantics described above: constants never tick, PRE cells tick when their second argument ticks, SELECT cells tick when their second argument ticks and evaluates to TRUE with the value specified in their first argument, and all other cells (including invocations of WINDOW) tick when any of their arguments ticks.

Code Generation.

Using this information, the compiler generates, for each input stream, a function that propagates the computation through all ticking cells. This function operates in two steps: it first updates all cells that contain an invocation of PRE, copying parts of the previous state as appropriate, then computes the new values for all other cells. PRE cells can potentially reference each other in cycles, and updating their values may require additional temporary memory (at most the number of such cells). Other cells, by construction, do not have cyclic dependencies, and the compiler emits code that updates these other cells in-place, following a topological ordering of their dependency graph. For a spreadsheet with p invocations of PRE and n other cells, the generated class will therefore need to store at most 2·p+n values (not counting time-based windows). The actual storage requirements are reduced by an optimization phase that identifies cells occurring in a single propagation function, and promotes them to temporary, locally-allocated, variables.

The generated code is supported by a companion C++ library for manipulating spreadsheet values. Values are represented using a single universal type, encoded as a tagged union. Spreadsheet functions (IF, SUM, etc.) are written in header-only, templated code, such that the output of the spreadsheet compiler can be properly optimized when passed to the C++ compiler. For instance, functions of variable arity such as SUM are implemented using loops, but the loop bounds are always determined statically and passed as template arguments. The language of supported spreadsheet functions is extended simply by writing C++ implementations for the desired functions.

Public Interface.

The compiled class exposes public member functions serving three purposes: 1) setters, used to communicate new values to fill input cells, 2) compute, used to trigger the recomputation of the spreadsheet, and 3) getters, used to retrieve the values of output cells. The protocol for a client to process a tuple from a stream is to first invoke the setters corresponding to each attribute, then trigger the computation, and finally to inspect the values of the desired output cells. The getters accept as a parameter a pointer to a Boolean, allowing the compiled spreadsheet to communicate to the client whether the output value has ticked since the last inspection. In the case of a spreadsheet using timebased windows, the timestamp corresponding to the tuple arrival time is passed as an argument to compute.

Time-Based Windows

Windows and aggregations are supported by a Window class and an Aggregate class with its subclasses in the companion C++ library. A Window object maintains a FIFO buffer of time/value pairs, as well as the elements evicted and inserted in the current tick. Each Aggregate object holds a constant pointer to its base window, and maintains a data structure for fast incremental aggregation.

Table 1 lists the supported aggregations, with their signature, description, data structure, and algorithmic complexity. In the algorithmic complexity, n is the number of elements in the window. The time complexity is the worst-case of evict, insert, or compute calls (typically, these three have the same complexity). The implementation of MATCH currently only supports mode m=0, which implements exact matches. The implementation of Match uses a map from values to stable indices, which are the indices an element would have if there were no evictions. To obtain the actual index, subtract the total number of evictions that happened so far. The implementation of LARGE uses an order statistics tree, which is a balanced search tree where internal nodes track statistics of the sizes of their subtrees. Since elements in a search tree are ordered, a single traversal can find the kth largest element using these statistics.

TABLE 1

Incremental aggregations on sliding windows

| Function | Description | Data structure | Time, Space |
| --- | --- | --- | --- |
| SUM(w) | Total of the numbers in w. | Float | O(1), O(1) |
| AVERAGE(w) | Arithmetic mean of the numbers in w. | Two floats | O(1), O(1) |

TABLE 1-continued

Incremental aggregations on sliding windows

| Function | Description | Data structure | Time, Space |
| --- | --- | --- | --- |
| COUNT(w) | Number of elements in w with numbers. | Integer | O(1), O(1) |
| COUNTIF(w, v) | Number of elements in w that equal v. | Hash multi-set | O(1), O(n) |
| INDEX(w, i) | Element of w at index i, where 1 is the oldest. | Resizable circular buffer | O(1), O(n) |
| MATCH(v, w, m) | Index of element equal to v in w if m is 0 (exact match). | Tree multi-map, integer | O(log n), O(n) |
| LARGE(w, k) | Number in w that is the k th largest, where 1 is the max. | Order statistics tree | O(log n), O(n) |

It is common for multiple aggregates to refer to the same window. For instance, in FIG. 5, window B10 is referenced by three INDEX calls, and window C10 is referenced by three LARGE calls and three MATCH calls. As another example, COUNTIF(w,INDEX(w,COUNT(w)))=1 checks whether the last number inserted into a window is unique, and can hence be used to encode the IStream operator from stream-relational algebra. Since windows are often shared among multiple aggregates, the design of embodiments of the invention minimizes redundancy in the storage and computation for sliding-window aggregation.

Subclasses of Aggregate offer separate methods update and apply. When a window changes, the update functions of all dependent aggregates are called. They query the window for the elements evicted and inserted in the current tick, and update their data structures accordingly. The arguments to the apply function consist of the latest values of all non-window inputs to the aggregation. For example, the inputs to COUNTIF are a window w and a value v, and therefore, COUNTIF::apply has one argument, the value v. In other words, the apply functions are curried on the window argument. The apply function gets called each time the aggregate ticks, i.e., each time any of its inputs ticks. Note that the aggregate might tick more frequently than its corresponding window, if one of its other inputs ticks independently.

Runtime Support

Figure 9:
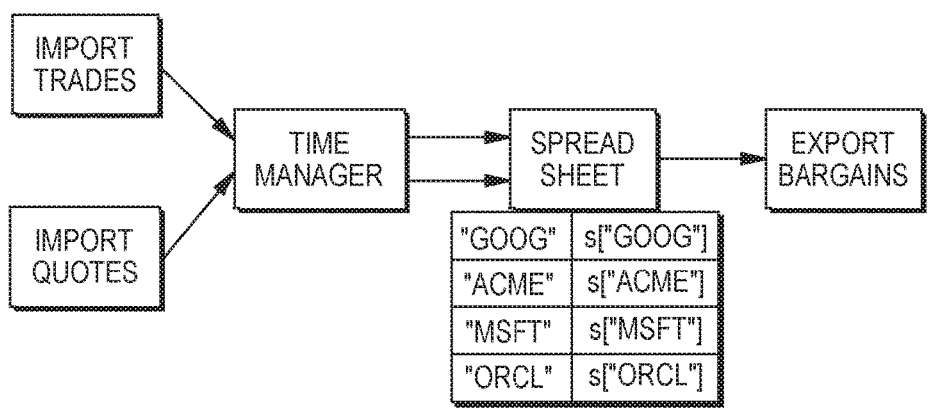
FIG. 9 shows a stream graph with spreadsheet operator.

FIG. 9 shows a Spreadsheet operator generated by the compilation depicted in FIG. 8 in the context of a simple stream graph. The Import and Export operators can be based on TCP; or can use pub-sub when business users create adhoc spreadsheets; or can contain local input generators and output validators for testing purposes. The TimeManager establishes universal time as discussed above, e.g.

The state of a partitioned spreadsheet operator holds a mapping from keys (e.g. "ACME") to spreadsheet states (e.g. s["ACME"]). A spreadsheet state holds the values of cells that did not tick along with any data required to implement PRE and WINDOW. When an input tuple arrives, the spreadsheet operator extracts the key, retrieves the spreadsheet state, and calls the appropriate cell setters. Upon a firing (triggered by an input tuple or punctuation), the operator calls compute on the spreadsheet state for the right key, and submits tuples on output streams corresponding to output cells that ticked, if any. In general, the stream graph can of course also contain more operators than shown in FIG. 9, such as operators that parse XML or enrich streams with quasi-static information from a database.

Figure 10:
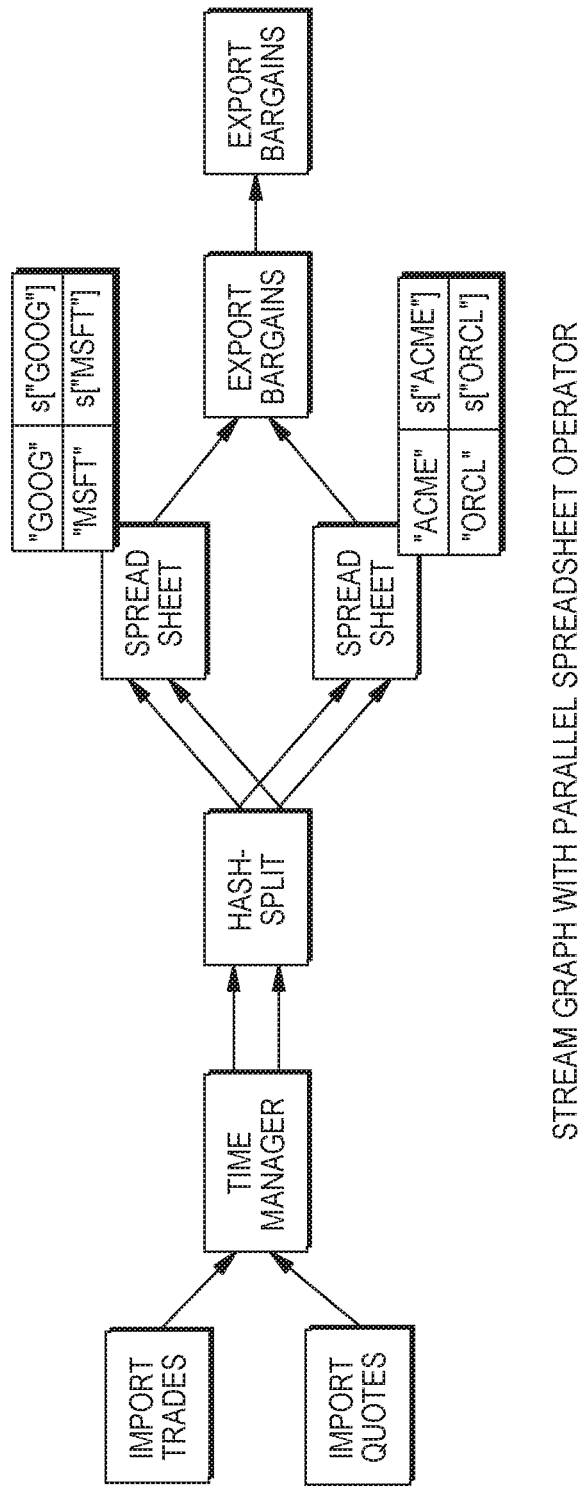
FIG. 10 illustrates a stream graph with parallel spreadsheet operator.

Partitioning can be exploited for parallelization. FIG. 10 shows a version of FIG. 9 that adds data parallelism by using multiple replicas of the Spreadsheet operator. Each replica along with its sub-streams is referred to as a parallel channel. For illustration purposes, FIG. 9 shows only two channels, but in general, the number of channels is a tradeoff between speedup and resource consumption. The Hash-Split operator sends each tuple to a channel determined by its key. That guarantees that tuples with the same key always go to the same channel, and thus, the Spreadsheet operator in each channel holds the correct spreadsheet state. Since state is disjoint, no inter-channel communication is required.

Tuples within a single channel are delivered in order, but tuples in different channels may be out-of-order depending on processing and communication speed. Therefore, the stream graph contains an OrderedMerge operator that interleaves tuples from all channels in an order consistent with their timestamp attributes. Note that the sequence of timestamps can have gaps but no duplicates, since the formal semantics enables sampling but not stuttering. The OrderedMerge maintains one FIFO queue per channel. When OrderedMerge receives a tuple, OrderedMerge inserts the tuple to the corresponding queue, and then drains all queues as much as possible. OrderedMerge can drain (dequeue and submit) a tuple if the tuple's timestamp is minimal among all tuples at the front of channel queues and there is no empty queue. The latter requirement guarantees that there are no tuples with smaller timestamps in-flight on any channel whose queue is currently empty. To avoid deadlock, the channel queue sizes are dynamic; an alternative solution would be to periodically flush all channels.

Experimental Study

Embodiments of the invention were evaluated with a number of benchmarks. For the purpose of evaluation, an SPL benchmarking harness code around the spreadsheet operators was written following the illustration in FIG. 8. The discussion below describes the benchmarks, reports the performance results, quantifies the impact of incremental window updates on performance, and discusses parallelization.

Benchmarks

The twitter example was described above. It comprises two spreadsheet operators. The other benchmarks comprise one spreadsheet operator each.

The vwap example is motivated by a trading application [A. N. Madhavan. Volume-weighted average price (vwap). In Encyclopedia of Quantitative Finance, 2010]. This example uses both time-based windows and stock-ticker based partitions. It computes the volume-weighted average (VWAP) price of a stock over a 5-minute sliding window and compares the running average with a stream of quotes to decide which quotes are bargains, i.e., priced below the average.

The linearroad example is a vehicle toll system for expressways with variable toll rates. The implementation, in embodiments of the invention, assumes a partitioning by road segments as this is the most natural to implement in the spreadsheet. It follows the design sketched in [A. Arasu, S. Babu, and J.Widom. The CQL continuous query language: semantic foundations and query execution. Journal on Very Large Data Bases (VLDB J.), 15(2):121-142, 2006].

The kalman example implements a Kalman filter to estimate the state of a system based on a stream of noisy and inaccurate measurements. The computation of the estimation depends on past values, and in the spreadsheet we use PRE to retain this state. The pong example calculates a 2D line intersect to play the game Pong, i.e., to position the paddle to catch the ball. This example assumes a single incoming stream of positions and velocities for all the games currently being played and uses partitioning by game id to separately keep track of the state of each game. The remaining examples are tax which calculates progressive income taxes using a table to encode tax brackets, forecast which performs linear regression using least-square fit to predict future temperatures, and average which calculates a recency-weighted average.

The test suite is summarized in Table 2.

TABLE 2

| Benchmarks | | | | |
|---|---|---|---|---|
| | cells | exprs | windows | partition |
| twitter | 22 | 36 | 3 × 5 m | lang |
| vwap | 9 | 14 | 2 × 5 m | ticker |
| linearroad | 20 | 18 | 3 × 30 s & 2 × 5 m | segment |
| kalman | 14 | 21 | 2 × 2 | target id |
| pong | 35 | 86 | — | game id |
| tax | 21 | 37 | — | — |
| forecast | 43 | 60 | 2 × 6 | location |
| average | 33 | 27 | 2 × 6 | — |

For each example, the table shows the number of cells needed to encode the computation in the spreadsheet (conflating the two operators for twitter) as well as the number of live expression nodes in the abstract syntax tree after dead-code elimination, e.g., a cell containing the equation (A1*A2)±(B1*B2) results in three expression nodes. The formulas are relatively easy to express in the spreadsheet compared to writing the comparable code in an imperative language, particularly when partitions and windows are used, since these are one-liners in the spreadsheet. As an example, we can compare the formulas for cell C6 in FIG. 11 with the corresponding SPL code in FIG. 12, which is spread across multiple lines including 15 for the duration of the window, 35 for insertion into the window and 40 for eviction.

In Table 2, the window column reports the number and size of each window in the benchmark as N×W where N is the number of windows and W is the size of the windows either in time or number of historical values, e.g., 2×5 m represents 2 windows that are 5-minute long, and 2×6 are two windows each containing 6 historical values. The partition column records the attribute used for partitioning the input stream.

Spreadsheet Throughput

Each spreadsheet was compiled and ran as part of an SPL test harness on a 2-processor machine with 32 GB of RAM running Red Hat Enterprise Linux Server release 6.5. Each processor is a 2.93 GHz Intel Xeon X5570 with 4 cores and 8 hardware threads. The experiments were repeated 5 times and the arithmetic mean throughput is reported throughout. The input sets were created using real traces when available and synthetically generated data otherwise.

The throughput for each benchmark (SS) is reported in Kilo tuples per second (Ktps). This is calculated by recording the total time spent in the spreadsheet operators including the cost to read and write data from the I/O streams. Every benchmark processed a total of 1M input tuples. The results are shown in Table 3.

TABLE 3

Throughput results

|  | SS Ktps | SPL Ktps | SS/SPL |
| --- | --- | --- | --- |
| twitter | 45.91 | 30.06 | 1.52 |
| vwap | 960.61 | 399.39 | 2.41 |
| linearroad | 964.32 | 798.72 | 1.21 |
| kalman | 3,816.79 | 8,196.72 | 0.47 |
| pong | 480.77 | 3,937.01 | 0.12 |
| tax | 1,383.13 | 4,975.12 | 0.28 |
| forecast | 913.24 | 7,936.51 | 0.12 |
| average | 3,937.01 | 8,000.00 | 0.49 |

The spreadsheet is compared throughput to native SPL implementations for each benchmark. These appear in the table under the heading SPL. The last column in the table computes the ratio between the SS and SPL throughputs such that a value less than one indicates the spreadsheet operator is slower than SPL and conversely a value greater than one indicates the spreadsheet operator is faster.

The last five spreadsheet operators are 2× to 8.7× slower than SPL. Given that SPL is a state-of-the-art production system designed for very high frequency and low latency applications such as real-time trading, these results may be considered as good. In the case of twitter, vwap, and linearroad, embodiments of the invention outmatch SPL. The compiled spreadsheet operator is respectively 1.52×, 2.41×, and 1.21× faster than the hand-written SPL code. The average slowdown compared to SPL is 2× (geometric mean over all the benchmarks).

Incremental Window Updates

The three test cases with unbounded windows are twitter, vwap and linearroad. For these, the impact of incremental window updates was measured. For instance, the average occupancy of a window for vwap is 7,800 trades and the incremental updates results in a 6.8× speedup end-to-end. For linearroad, we measure a 83× speedup. The windows in twitter have lower average occupancy and the effect of incrementalization is negligible.

The hand-written SPL codes for the benchmarks also implement incremental window updates as illustrated in FIG. 12. In contrast to the compiler however, incrementalization in SPL must be done manually for each aggregate, a task which requires considerable effort.

Parallel Replicas

The performance numbers reported for SS and SPL are all using a single thread of execution. One of the advantages of deploying the spreadsheet operator in SPL is the ease of parallelization. This is achieved by adding an annotation to the operator @parallel(width=N,partitionB y=[{port=Inputs, attributes=[ticker]}])

where N is a submission-time parameter to control the number of replicas, and ticker is the partitioning key. The SPL runtime takes care of instantiating the replicas, spreading inputs across replicas, and merging outputs.

Because the benchmarks are small though and incrementalization is very effective significant performance benefits are not observed from enabling parallelization. This observation holds for both the hand-written SPL code and the spreadsheet operators.

The experiments demonstrate that the spreadsheet compiler described herein yields fast code anywhere between 8.7× slower to 2.4× faster than hand-written SPL code—2× slowdown on average. Moreover, incremental window updates dramatically improve performance for application with large windows.

Embodiments of the invention provide a spreadsheet operator that augments the spreadsheet paradigm with time-based windows and partitioning, features that manipulate large or unbounded data sets, and overcome the finite nature of the interface. Spreadsheet operators are expressive, yet easy to use for nonprogrammers. The spreadsheet operators use a compiler to C++ that provides higher performance, allowing them to compose with other operators in larger production applications deployed in modern stream processing systems. A variety of benchmarks illustrate the expressivity and demonstrate the performance of the spreadsheet operators.

Figure 13:
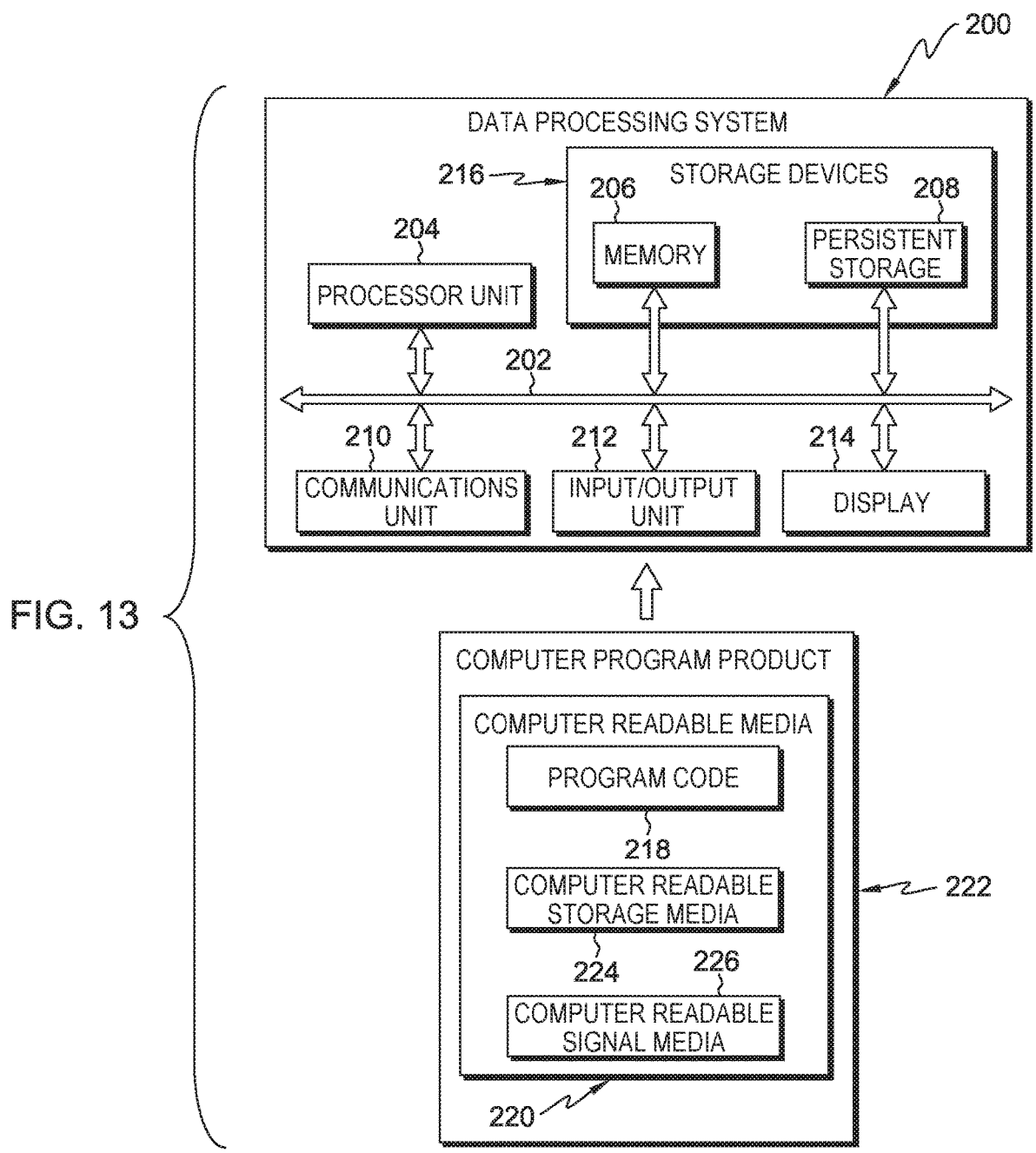
FIG. 13 depicts a diagram of a data processing system in accordance with an illustrative embodiment.

FIG. 13 depicts a diagram of a data processing system in accordance with an illustrative embodiment. Data processing system 200 is an example of a computer, such as server or client, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of compiling a spreadsheet to execute stream processing in a computing system, the computing system receiving a stream of input data values, and the spreadsheet including a function encoded therein for processing at least some of said input data values, the method comprising:
   a compiler reading the spreadsheet and extracting the function from the spreadsheet;
   the compiler generating a spreadsheet operator to execute said function in the computing system, including
      said spreadsheet operator supporting data windows by recording said at least some of said input data values in one or more windows; for each of the data windows, computing a computed value from said recorded input data values, including using a window object for maintaining a buffer of the recorded values in the each data window; changing the input data values recorded in the data windows; incrementalizing computations of the values in the data windows by recomputing the computed values from the input values in the data windows when the input values recorded in the data windows change, and using an aggregate object for maintaining a data structure for the computed values for the data windows, and
      the spreadsheet operator supporting stream partitioning partitioning the stream of input data values received by the computing system into a sub-stream of the input data values using a key specified in the function encoded in the spreadsheet; and
   at specified times, the spreadsheet operator executing the function, using one or more of the input data values, to compute an output value, and storing the output value in an output cell of the spreadsheet.

2. The method according to claim 1, wherein:
the stream partitioning includes partitioning a data stream into a plurality of data stream partitions; and
the method further comprises applying the extracted function to the plurality of data stream partitions.

3. The method according to claim 2, wherein the applying the extracted function to the plurality of data stream partitions includes applying the extracted function to the plurality of data stream partitions in series.

4. The method according to claim 2, wherein the applying the extracted function to the data stream partitions includes applying the extracted function to the data stream partitions in parallel to parallelize computations over said stream partitions.

5. The method according to claim 2 wherein:
the extracted function includes a plurality of formulas; and
the applying the extracted function to the plurality of data stream partitions includes processing each of the data stream partitions according to one of the formulas.

6. The method according to claim 2, wherein the processing each of the data stream partitions according to one of the formulas includes processing each of the data stream partitions according to a respective one of the formulas.

7. The method according to claim 1, wherein the windows are time based windows and collect values in a given data stream from specified time intervals moving over time.

8. The method according to claim 1, wherein the windows are count based windows and collect a specified number of values in a given data stream.

9. The method according to claim 1, wherein the windows have variable sizes.

10. The method according to claim 1, wherein:
the spreadsheet operator comprises a finite collection of cells of the spreadsheet; and
all the cells in the spreadsheet operator map from partition keys to values in a given data stream.

11. The method according to claim 1, wherein the compiler generating a spreadsheet operator further includes:
connecting the spreadsheet operator to an output stream and an input stream;
assigning attributes of input tuples to cells of the spreadsheet;
identifying attributes serving as partitioning keys; and
assigning cells of the spreadsheet to attributes of output tuples.

12. The method according to claim 1, wherein the spreadsheet operator executing the function includes the spreadsheet operator, at the specified times, updating one or more input cells of the spreadsheet with one or more of the values from one of the data windows.

13. The method according to claim 12, wherein the spreadsheet includes a plurality of input sells, and the spreadsheet operator executing the function further includes the spreadsheet operator, at the specified times, copying each value of a plurality of the values in the input cells from one of the input cells into another of the input cells.

14. A compiling system for compiling a spreadsheet to execute stream processing, the spreadsheet including a function encoded therein for processing at least some of said input data values, the compiling system comprising:
at least one computer system for receiving a stream of input data values, and including at least one processor unit and a memory connected to the at least one processor unit; said at least one processor unit including:
a compiler for reading the spreadsheet, and generating a spreadsheet operator to execute said function in the computer system, including
at least one extracting module for extracting the function from the spreadsheet;
the spreadsheet operator supporting data windows by recording said at least some of said input data values in one or more data windows; for each of the data windows, computing a computed value from said recorded input data values, including using a window object for maintaining a buffer of the recorded values in the each data window; changing the input data values recorded in the data windows; incrementalizing computations of the values in the data windows by recomputing the computed values from the input values in the data windows when the input values recorded in the data windows change, and using an aggregate object for maintaining a data structure for the computed values for the values in the data windows,
the spreadsheet operator supporting the stream partitioning by partitioning the stream of input data values received by the computing system into a sub-stream of the input data values using a key specified in the function encoded in the spreadsheet; and
at specified times, the spreadsheet operator executing the function, using one or more of the input data values, to compute an output value, and storing the output value in one an output cell of the spreadsheet.

15. The system for compiling a spreadsheet according to claim 14, wherein:
the stream partitioning includes partitioning a data stream into a plurality of data stream partitions; and
the at least one computer system further includes a module for applying the extracted function to the data stream partitions in series.

16. The system for compiling a spreadsheet according to claim 14, wherein:
the stream partitioning includes partitioning a data stream into a plurality of data stream partitions; and
the at least one computer system further includes a module for applying the extracted function to the data stream partitions in parallel to parallelize computations over said stream partitions.

17. The system for compiling a spreadsheet according to claim 14, wherein:
the at least one computer system further includes a module for applying the extracted function to the data stream partitions in series;
the at least one computer system further includes a module for storing input values from the data stream partitions in the input cells of the spreadsheet program, applying the function encoded in the spreadsheet program to the input values stored in the input cells to produce output values, and storing the output values in the output cells of the spreadsheet program.

18. A computer program product comprising:
a computer readable medium having computer program code tangibly embodied therein for compiling a spreadsheet to execute stream processing in a computer system, the computer system receiving a stream of input data values, and the spreadsheet including a function encoded therein, the computer program code, when executed in the computer system, performing the following:
using a compiler for reading the spreadsheet and extracting the function from the spreadsheet;

using the compiler for generating a spreadsheet operator to execute said function in the computer system including, said spreadsheet operator supporting data windows by recording said at least some of said input data values in one or more data windows; for each of the data windows, computing a computed value from said recorded input data values; including using a window object for maintaining a buffer of the recorded values in the each data window; changing the input data values recorded in the data windows; incrementalizing computations of the values in the data windows by recomputing the computed values from the input values in the data windows when the input values recorded in the data windows change, and using an aggregate object for maintaining a data structure for the computed values for the data windows, the spreadsheet operator supporting stream partitioning by partitioning the stream of input data values received by the computing system into a sub-stream of the input data values using a key specified in the function encoded in the spreadsheet:

at specified times, the spreadsheet operator executing the function, using one or more of the input data values, to compute an output value, and storing the output value in an output cell of the spreadsheet.

19. The computer program product according to claim 18, wherein the stream partitioning includes partitioning a data stream into a plurality of data stream partitions.

20. The computer program product according to claim 18, wherein the computer program code, when executed in the computer system, performs the further:

applying the extracted function to the plurality of data stream partitions in series.

* * * * *